(12) United States Patent
Cohn

(10) Patent No.: US 8,223,815 B2
(45) Date of Patent: Jul. 17, 2012

(54) MULTIPLE DISCHARGE $CO_2$ LASER WITH IMPROVED REPETITION RATE

(75) Inventor: David B. Cohn, Torrance, CA (US)

(73) Assignee: DBC Technology Corp., Torrance, CA (US)

(*) Notice: Subject to any disclaimer, the term of this patent is extended or adjusted under 35 U.S.C. 154(b) by 193 days.

(21) Appl. No.: 12/846,422

(22) Filed: Jul. 29, 2010

(65) Prior Publication Data

US 2012/0027042 A1 Feb. 2, 2012

(51) Int. Cl.
  *H01S 3/22* (2006.01)
  *H01S 3/223* (2006.01)
  *H01S 3/097* (2006.01)
(52) U.S. Cl. .................. 372/58; 372/55; 372/57; 372/83
(58) Field of Classification Search .................... 372/55, 372/57, 58, 83
  See application file for complete search history.

(56) References Cited

U.S. PATENT DOCUMENTS

| 4,099,143 A | 7/1978 | Foster |
| 4,429,398 A | 1/1984 | Chenausky et al. |
| 4,686,680 A | 8/1987 | Hoag et al. |
| 4,756,000 A | 7/1988 | Macken |
| 5,014,282 A | 5/1991 | Herziger et al. |
| 5,027,366 A | 6/1991 | Arkins et al. |

OTHER PUBLICATIONS

Willis, C., et al., Catalytic Control of the Gas Chemistry of Sealed TEA $CO_2$ Lasers, Journal of Applied Physics, vol. 50, No. 4, Apr. 1979, pp. 2539-2543, American Institute of Physics, Melville, New York, USA.
Lewis, Paul, et al., Catalyst Selection for a Re-Pulsed High Power Self-Sustained Discharge $CO_2$ Laser, SPIE, Gas and Chemical Lasers, vol. 2702, pp. 385-395, SPIE, Bellingham, Washington, USA.
Stark, D.S., et al, A Sealed 100-Hz $CO_2$ $_{TEA}$ Laser Using High $CO_2$ Concentrations and Ambient-Temperature Catalysts, Journal of Physics E. Scientific Instruments, vol. 16, No. 2, Feb. 1983, IOP Publishing Ltd., Bristol, UK.
Uteza, O., et al., Improvement of Average Laser Power and Beam Divergence of a High Pulse Repetition Frequency Excimer Laser, Applied Physics B, Lasers and Optics, vol. 66, 1998, pp. 31-37, Springer-Verlag, New York, New York, USA.
Willis, C., et al., Use of $^{13}CO_2$ in High-power Pulsed TEA Lasers, Rev. Sci. Instrum. 50(9), Sep. 1979, pp. 1141-1143, American Institute of Physics, Melville, New York, USA.

*Primary Examiner* — Armando Rodriguez
(74) *Attorney, Agent, or Firm* — Boyle Fredrickson, S.C.

(57) ABSTRACT

A $CO_2$ gas flow laser with multiple discharge modules places acoustic baffles between the discharge modules to suppress shock waves and ions passing between the discharge modules such as may disrupt the optical path of the laser. A catalyst may be placed in a center of a toroidal recirculation chamber of the laser and may have integrated filters to prevent catalyst particulates from coating the chamber optical windows.

14 Claims, 8 Drawing Sheets

MULTIPLE DISCHARGE $CO_2$ LASER WITH IMPROVED REPETITION RATE

BACKGROUND OF THE INVENTION

This invention relates in general to gas lasers and in particular to the $CO_2$ transverse discharge type with a flowing gas laser medium.

The transverse discharge, transverse gas flow $CO_2$ laser operates in atmospheric pressure laser gas mixtures. The laser makes use of two parallel highly elongated electrodes separated by a small gap within which a short pulse glow discharge is initiated by a high voltage electrical pulse that causes pumping of the upper laser state with subsequent laser emission, the entire pumping and emission sequence taking on the order of several microseconds. Most of the discharge pump power is converted into heating the laser gas which must be maintained at a fixed temperature by a heat exchanger. The two electrodes, the insulating features that hold them in alignment, the high voltage pulser, and the high voltage current feedthrough define a single discharge module.

Each discharge pulse produces ionized gas plasma discharge products within the vicinity of the inter-electrode gap and acoustic shock waves that emanate from the gap area, reflect off surrounding structures, and reenter the gap. Both types of disturbance must be damped or be cleared away before the next pulse, otherwise the subsequent discharge will be disrupted and the quality of the laser output degraded. A background gas flow through the electrode gap performs the plasma clearing function. Acoustic damping, if allowed to proceed by reflection off bare metal surfaces, gives useful discharge repetition frequencies of about 400 Hz. To achieve higher frequencies, acoustic dampers are placed on the vessel side walls, outside the background gas flow so as not to impede it, and the acoustic disturbances are rapidly attenuated by multiple reflection. Acoustic dampers which take the form of wall-mounted perforated metal screens or ceramic material complicate the laser structure, increase its size, and add particulates to the main gas flow in the latter case.

In the case of the $CO_2$ laser, the repetitive glow discharge dissociates $CO_2$ into its stable constituent molecules CO and $O_2$ leading to depletion of the lasing species and a buildup of $O_2$ which degrades discharge uniformity causing highly variable output. Both effects limit the useable lifetime of a sealed gas laser. Lifetime can be extended by replenishing the laser gas from an auxiliary reservoir, but such a reservoir itself has a finite gas supply and it adds considerably to the size and weight of the laser system rendering this approach not practicable in many applications. In order to achieve longer laser lifetime in a compact sealed laser, a $CO_2$ regeneration catalyst is used wherein laser lifetime is extended theoretically indefinitely. Catalysts for $CO_2$ lasers have several forms as reported in the technical literature, including small spheres or cylinders that can be used to fill a catalyst bed, discs that can be placed in a low pressure drop array in a catalyst bed, and single honeycomb structures that can be placed whole in the gas stream. All of these catalyst types have the thin active catalyst material layer loosely bound to an inert substrate, and particles from this layer are continuously liberated to enter the gas flow stream from which they can coat the vessel optical windows and initiate optical damage.

The laser resonator is generally composed of a partially transmitting optic located in the vicinity of one end of the electrodes and another highly reflecting mirror or grating for wavelength selection located at the other end such that the two mirrors or mirror and grating face each other with their optical axes parallel to the electrode long dimension and centered in the electrode gap. Laser output energy scales with the length of the gain medium, length of the electrodes.

The $CO_2$ laser can emit light on approximately 65 different lines, depending upon details of the gain medium and optical resonator designs. Single line emission is of interest in such applications as laser radar and spectroscopy, and individual lines can be selected with a dispersive element such as a grating. However, many of the lines have low gain which often necessitates an increase in gain length, electrode length, to achieve acceptable output, resulting in a significant extension of laser size. This is the case with many of the low gain normal isotope $^{12}C^{16}O_2$ lines but to a greater extent with other isotopes such as $^{13}C^{16}O_2$ which emit in important spectral regions where the normal isotope cannot. There is also a requirement for laser beam transverse intensity profile selection between multimode for high statistical diversity and single mode for maintaining the highest intensity in propagating over long distances. Multimode output is favored with short gainlengths (short electrodes) and single mode output is favored with long gainlengths (long electrodes). It would be desirable to have selectability between short and long gainlengths in a single laser to conserve space and eliminate the complexity and cost of multiple lasers.

These problems have received attention in various patents and publications. U.S. Pat. Nos. 4,099,143 and 4,686,680 describe atmospheric pressure, fast gas flow, transverse discharge, transverse gas flow lasers with single sets of discharge electrodes. The gas motive force is supplied by fans that extend the full length of the electrodes and the gas flow describes an essentially circular path through a single set of discharge electrodes, turning vanes, and a heat exchanger. U.S. Pat. No. 4,686,680 shows two heat exchangers within a single flow system with single discharge module.

A study of wall-mounted acoustic dampers is presented in O. Uteza, "Improvement of average laser power and beam divergence of a high pulse repetition frequency excimer laser", Appl. Phys. B, 66 (1998).

U.S. Pat. No. 5,014,282 teaches how a folded resonator can be employed to take advantage of the large gain volume in a low gas pressure continuous wave laser. U.S. Pat. No. 4,429,398 teaches how a folded resonator can be used to couple two longitudinal gain media for simultaneous excitation and either single or separate dual wavelength output beams.

Various types of catalyst for use in $CO_2$ lasers have been described in Lewis, "Catalyst Selection for a Rep-Pulsed High Power Self-Sustained Discharge $CO_2$ Laser", SPIE 2702, 385 (1996). The use of catalysts has been described in Willis, "Catalyst Control of the Gas Chemistry of Sealed TEA $CO_2$ Lasers", J. Appl. Phys. 50 (4) April 1979 and Willis, et al "Use of $^{13}C^{16}O_2$ in high-power pulsed TEA lasers", Rev. Sci. Instrum., 50 (9), September (1979). U.S. Pat. No. 4,756,000 teaches how a catalyst can be implemented in a low pressure, longitudinal discharge $CO_2$ laser and also describes a circular flow geometry.

U.S. Pat. No. 5,027,366 teaches how an electrical precipitator can extract particulates from the gas stream of a gas laser and flow the clean gas in a purging curtain over the laser optics that are placed in a purge tube thus opposing the flow of particulates into the tube and onto the optics.

SUMMARY OF THE INVENTION

The invention recognizes that a pulsed high repetition rate $CO_2$ laser can be realized by use of multiple discharge modules sharing the same recirculating gas flow system with separating acoustic baffles. The baffles are designed to preferentially block high speed shock waves while freely allowing low velocity gas flow. Properly designed acoustic baffles may also provide plasma ion neutralization and heat exchanging functionality.

The invention also recognizes that current active catalyst materials can liberate particulates that can be carried with the gas stream throughout the laser eventually depositing on the laser optical windows. These deposits may act as sites for ablation initiated by the high power intracavity laser beam leading to optical damage which thereby places a practical limit on laser operational lifetime. Accordingly, another embodiment of the present invention may place filters in the flow path through the catalyst to capture these liberated particles.

Another embodiment of the present invention may place the catalyst within a toroidal laser cavity reducing the size of the laser assembly and the flow path length to and from the catalyst.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DESCRIPTION OF THE PREFERRED EMBODIMENT

Figure 1:
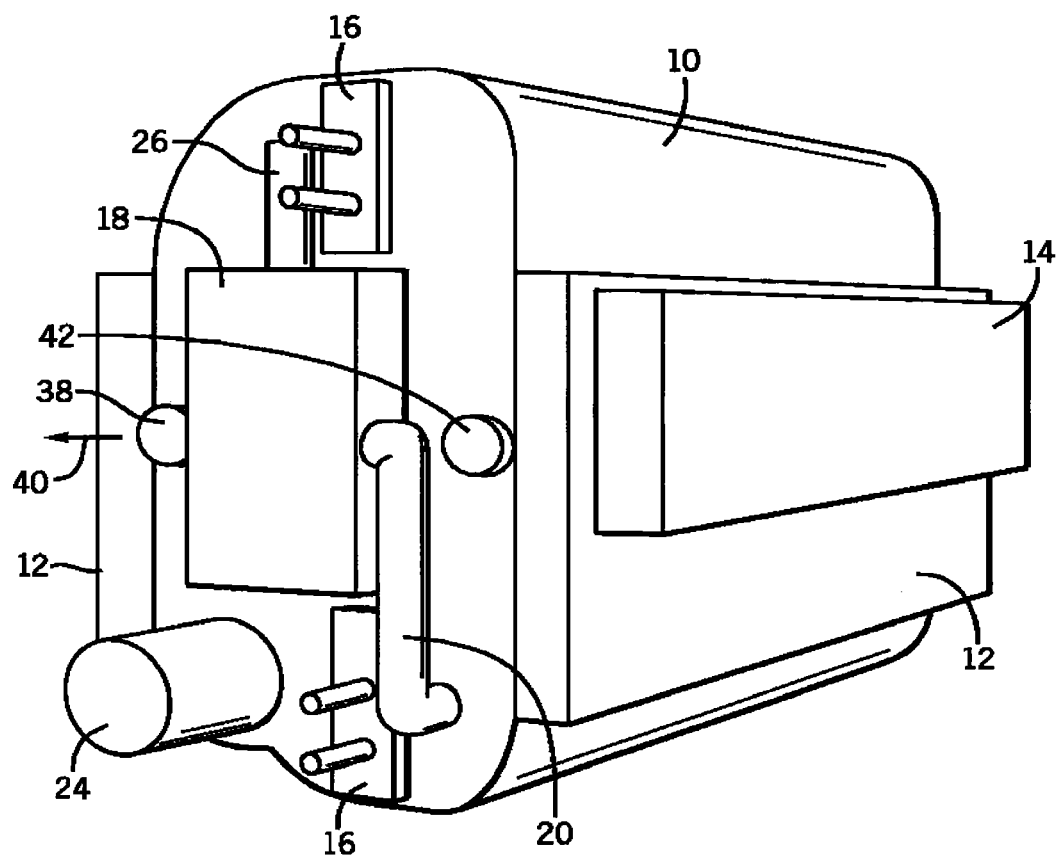
FIG. 1 is a perspective view of the enclosed laser.

Referring to FIG. 1 of the drawings, there is shown a laser whose internal components are contained within a gas vessel 10 with a cross-section similar to that of a slightly elongated torus having both inner and outer surfaces sealed. Flat top members 12 seal large access ports on opposite sides of the gas vessel and extend its full length. To both top members 12 are attached a high voltage pulser circuit 14 communicating with internal discharge electrodes (not shown in FIG. 1) extending the full length of the gas vessel 10. Catalyst module 18 is located in the air space at the center of the gas vessel 10 to form a compact arrangement of both elements. Laser gas heat exchangers 16 are located internally on opposite sides of the laser gas vessel between the two sets of electrodes and provide an acoustic and plasma baffle as will be described below. Externally located motor 24 powers a fan extending the full length of the gas vessel that causes the major portion of laser gas to move in a recirculating pattern, and motor 26 powers a fan within the catalyst module that causes extraction of a fraction of the major gas flow into the catalyst module 18 for processing therein.

Figure 2:
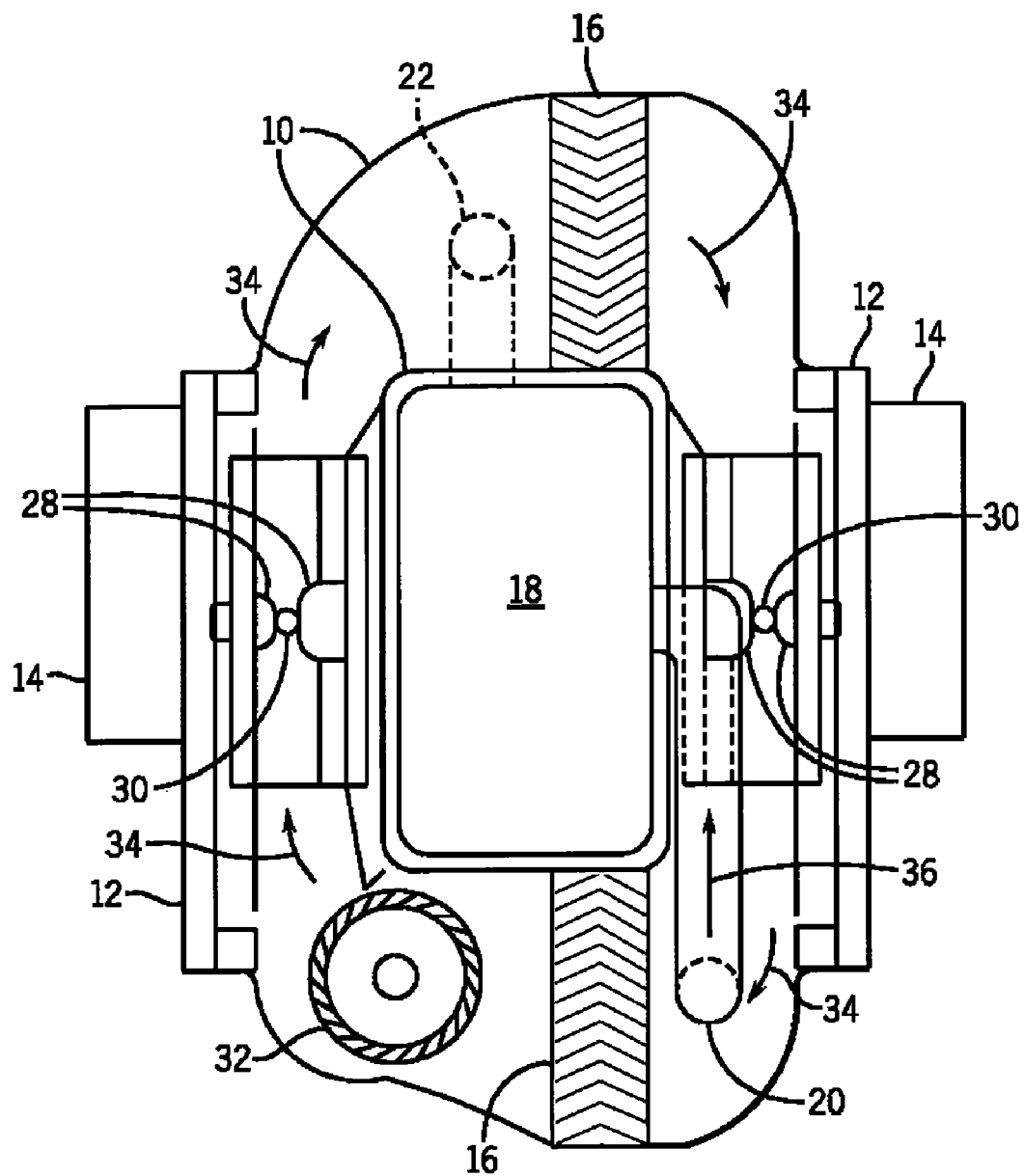
FIG. 2 is a schematic cross-section end view of the laser showing placement of the external catalyst module, dual discharge electrodes, and major gas flow components.

FIG. 2 is a cross-sectional view of the laser showing the near-toroidal form of the sealed gas vessel 10 with the location on opposite sides of the vessel of the combined discharge electrodes 28, top members 12, and pulser circuits 14. Fan 32, driven by external motor 26, which has been deleted for clarity, causes the gas to flow in a loop according to path arrows 34 through the discharge gap, between the electrodes and through the heat exchangers. Laser gas is drawn into the catalyst module through tube 20 at one end of the module and the gas processed through the catalyst module is reentered into the main flow stream through tube 22 at the other end of the module. The pulsed glow discharge that excites the laser gas takes place in the gap between each pair of electrodes and the excited gas defines a gain medium that extends the full length of the electrodes. The optical axis 30 for each gain medium is located at the center of the gain medium in the gap.

Generally, as will be described further below, each of the heat exchangers 16 may provide for a series of metallic fins bent into a chevron form extending the full length of the vessel. These fins (shown as the series of chevrons in the heat exchanger 16) provide an impedance to gas flow that may increase with gas flow velocity and thus reduce the propagation of shockwave disturbances therethrough while allowing the much slower background gas to flow through unimpeded. The fins may be attached thermally to a set of tubes conducting a fluid (possibly a liquid) to a separate heat exchanger for heat removal. The fins may also be grounded to help draw and neutralize ionized plasma in the gas. The heat exchanger so constructed isolates each discharge module from the plasma and acoustic disturbance of the other allowing for their independent operation and an effective doubling of the discharge repetition frequency, or for selection of either long or short gain lengths for emission on weak or strong lines, respectively as described below.

Figure 3:
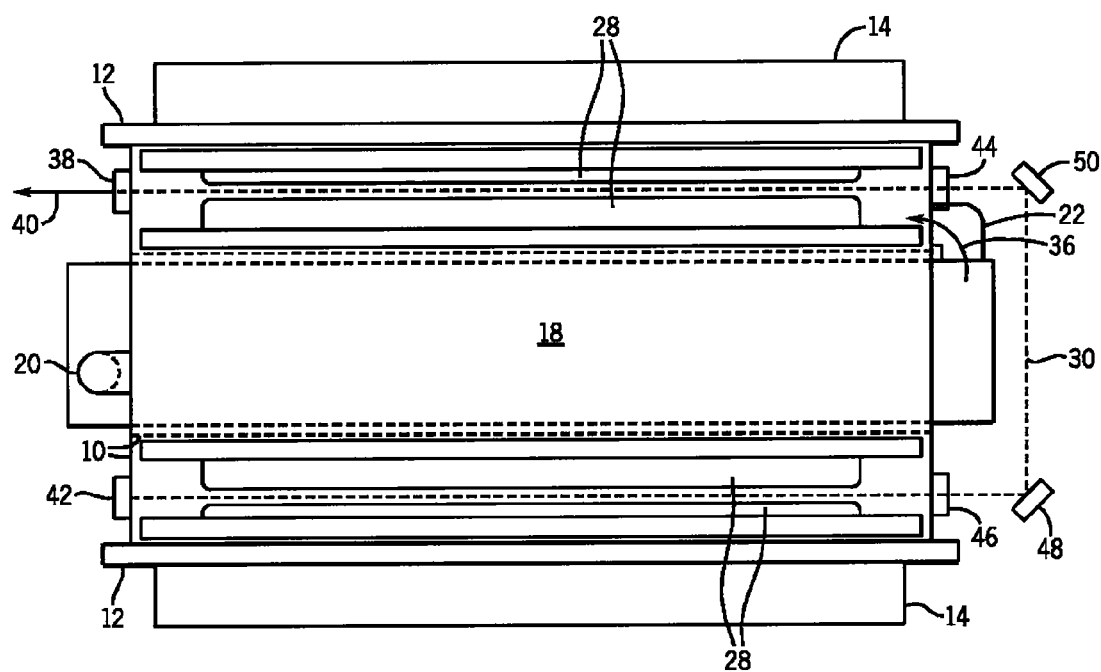
FIG. 3 is a schematic cross-section longitudinal view of the laser showing the discharge electrodes, resonator mirrors, and optical beam path.

FIG. 3 is a longitudinal cross-section of the laser showing the long parallel discharge electrodes with the narrow gap between and the position of the optical axis 30 at the center of the gap. The heat exchangers, fan, and fan motors have been deleted for clarity. In the preferred embodiment, the electrodes have a total width of 2 cm, a separating gap of 1 cm, and a length of 28 cm; and for a fan of diameter 5 cm rotating at 3,000 revolutions per minute, a single discharge module maximum repetition frequency of 300 Hz is obtained.

In the illustration of FIG. 3 is shown a long gain path laser with the gain media arranged optically in series to improve emission on single weak lines or high power on strong lines, where the optical path is defined by output coupler optic 38 through which the output beam 40 is extracted, total reflecting mirror 42, gas vessel windows 44 and 46, and external total reflecting turn mirrors 48 and 50. In the preferred embodiment, the optical clear aperture diameter is 2 cm. Laser wavelength selection for this arrangement can be achieved by replacing optic 42 with a grating. This long optical and gain medium path arrangement is also conducive to generation of single transverse intensity mode output which requires that the beam diameter to resonator length be in the ratio of approximately 1:1300. Alternatively, simultaneous or sequential emission of two separate beams at two different wavelengths or the same wavelength, can be achieved by replacing mirror 42 with an output coupling optic, through which the second beam is extracted, and replacing both fold mirrors 48 and 50 with gratings. The separation in time of emission of the two beams and their repetition rate are determined by the delay between the two discharge pulses and their period, respectively. It can be appreciated that adding additional pairs of discharge electrodes in the gas flow system will give additional overall gain for a single wavelength or additional independent beams of the same or different wavelengths.

Figure 4:
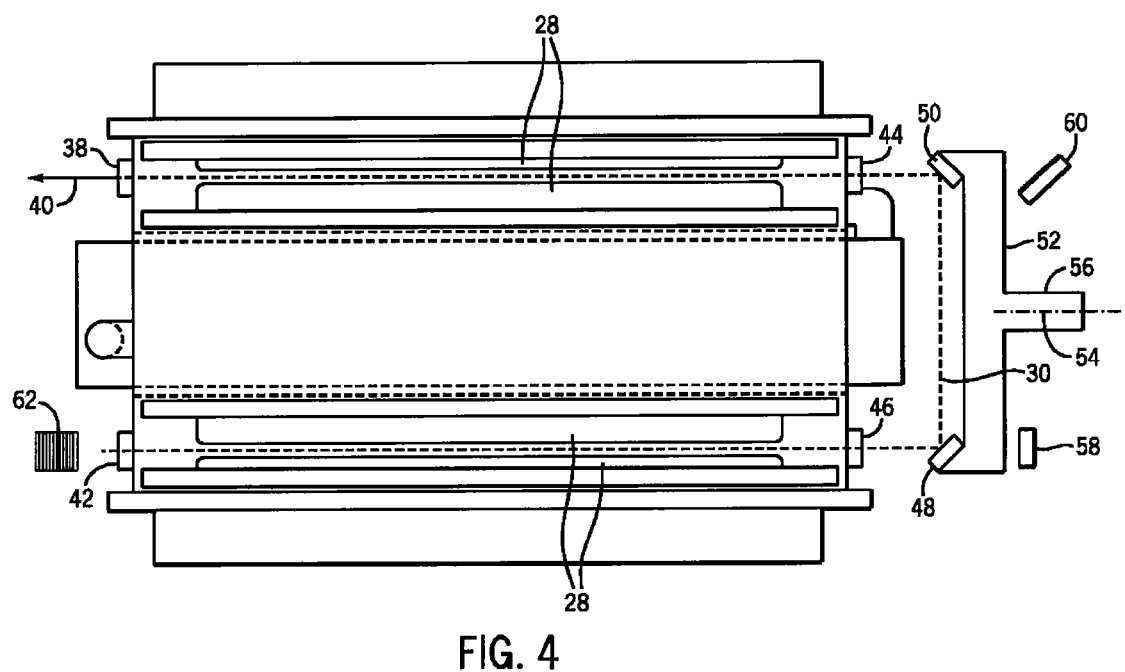
FIG. 4 is a schematic cross-section longitudinal view of the laser showing the main gas vessel components and optical path for a rotating member in position to select for a single long gain length optical path.

FIG. 4 shows an embodiment to achieve rapid selection of either of the two modes of long gain path for weak lines or two short independent gain paths for emission at different wavelengths. Gratings 60 and 62 and output coupler optic 58 are held rigidly in position by optical holders, not shown for clarity. The fold mirrors 48 and 50 are attached to the arms of a rigid optical holder 52 with a rotation shaft 56 attached to its center. By attaching a motor to shaft 56, the holder and mirror assembly can be made to rotate at high speed around axis 54 such that mirrors 48 and 50 are alternately in alignment for the long path resonator and rotated out of the beam path for emission of two beams.

Figure 5:
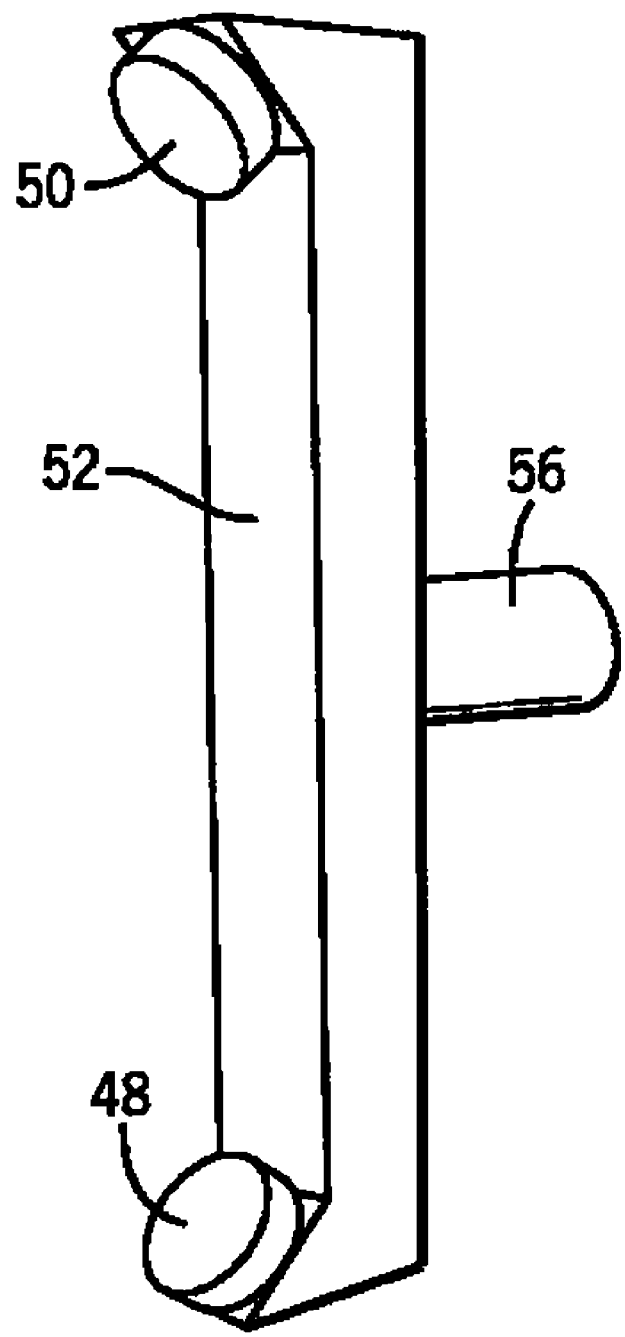
FIG. 5 is a perspective view of the optic rotating member.

FIG. 5 shows a perspective view of the two-mirror rotating optical holder. In one embodiment, the rotating shaft 56 is made of stainless steel and mounted in precision bearings to maintain alignment; and the motor is attached by a belt or flexible coupling so as not to impart vibration to the rotating optical holder. The mirrors 48 and 50 are required to be made of high optical damage threshold material that can be optically polished such as copper or molybdenum. The optics are attached by screws on their rear surfaces and aligned by shims. It is preferred to make the rotating member itself out of aluminum for stiffness and low inertia. It can be appreciated that for operation at high frequency of single beam and two beam selection, optical holder 52 can be made with additional arms or in the form of a 45 degree conical mirror with holes, where reflection off the cone surface gives the long gain path single beam and beam passage through the holes gives two uncoupled beams.

Figure 6:
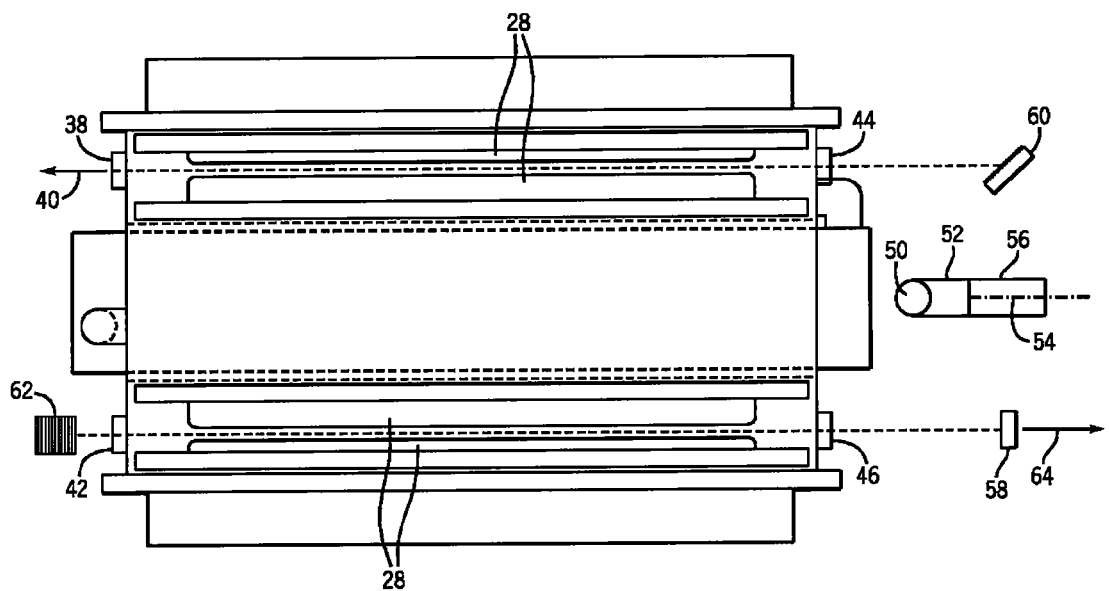
FIG. 6 is a schematic cross-section longitudinal view of the laser showing the main gas vessel components and optical path for the rotating member out of position to select for two laser beams at two or the same wavelength.

FIG. 6 shows the optical configuration for the rotating optical holder rotated such that fold mirrors 48 and 50 are rotated out of the beam path. In this case, one resonator is defined by output coupler optic 38 and grating 60, and the output beam 40 is along the direction indicated by the arrow. The second resonator is defined by output coupler optic 58 and grating 62, and its output beam is along direction 64. The two output beams, emitted in opposite directions, are linearly polarized orthogonally due to the orthogonal nature of the grating rulings. If necessary, the two beams can be recombined into a single collinear beam by the usual method of a reverse polarization beamsplitter optic.

Figure 7:
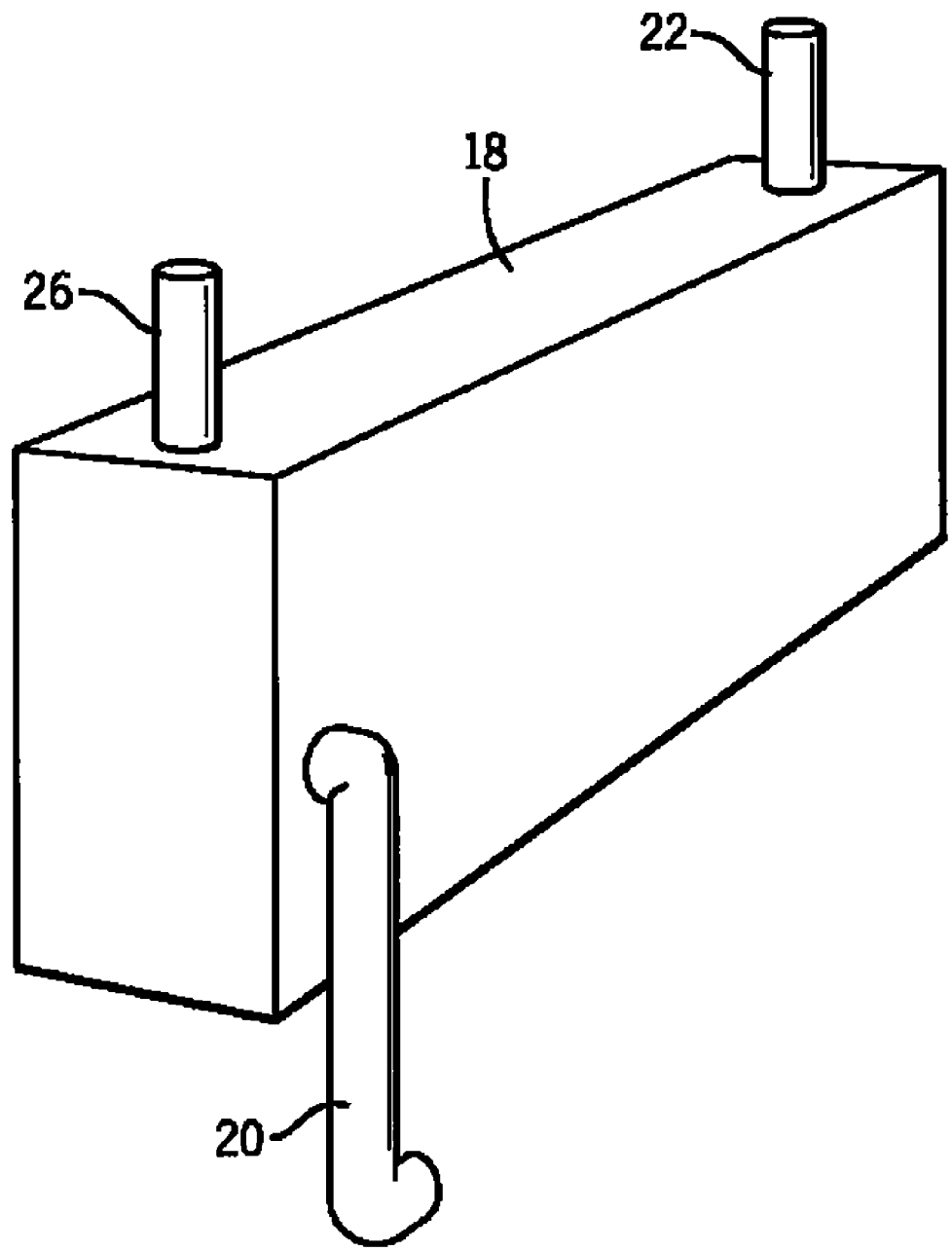
FIG. 7 is a perspective view of the external catalyst module.

Referring to FIG. 7, there is shown an isometric view of the catalyst module with an inlet tube to extract gas from the main laser gas vessel and an outlet tube to return processed gas back to the vessel. Not shown in the figure is a large removable gas tight hatch to allow access to the catalyst module internal components.

Figure 8:
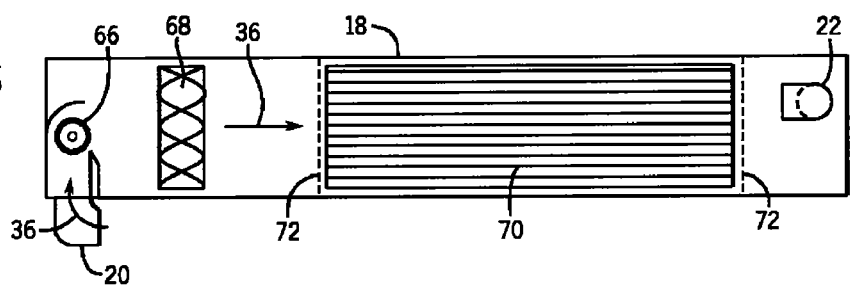
FIG. 8 is a schematic cross-section top view of the catalyst module showing placement of the inlet and outlet gas flow tubes and catalyst elements.

FIG. 8 is a top cross-sectional view of the sealed catalyst module showing the location of the inlet gas tube 20, gas flow direction 36, fan 66 that pulls a portion of the laser gas into the module, a wound nichrome heater wire assembly 68, a first gas filter 72, the catalyst bed 70, a second gas filter 72, and the gas exit tube 22. In one embodiment, the catalyst bed is made from a multitude of 5 mm diameter catalyst spheres that are held loose in a wire mesh container. In another embodiment, the catalyst is in the form of 20 mm diameter by 5 mm thick wheels held in alignment without touching on aluminum rods threaded through the wheel central hole.

Figure 9:
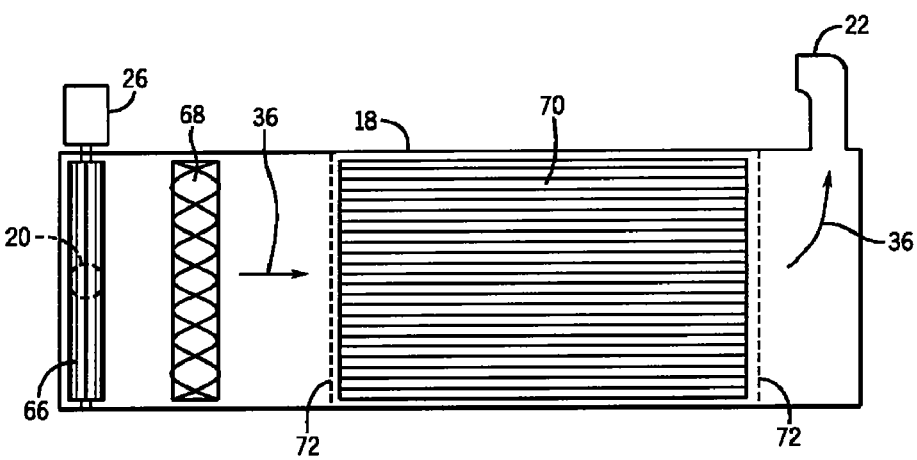
FIG. 9 is a schematic cross-section side view of the catalyst module showing placement of the gas flow fan, catalyst heater, and catalyst bed.

FIG. 9 is a side cross-sectional view of the catalyst module to clarify the location of the external fan drive motor 26 and the aspect ratios of the internal components. Gas inlet 20 and outlet 22 are shown as tubes for clarity of purpose and illustration, but other forms of gas inlet and outlet are possible such as a fan type flow member that would give more uniformity of flow across the fan and catalyst bed.

Approximately 10% of the main laser gas flow is drawn continually into the external catalyst module, it is preheated by the nichrome wire heater to approximately 60° C., passes through the catalyst where the CO and $O_2$ dissociated in the discharges are recombined, and the regenerated gas exits the module to be mixed with the main gas flow. The thermal energy added to the gas by the nichrome heater is a small fraction of the heat added by the discharges and is extracted by the main gas flow heat exchangers. The recombination rate achievable by the catalyst module is determined by the catalyst material base activity level, which depends on gas temperature, and the gas flow rate through the catalyst bed. The gas temperature and flow rate through the module are controllable independent of the main laser gas flow. The catalyst of whichever form is optimal in terms of flow pressure drop and base activity level is enclosed by filters to prevent particulates from entering the main laser gas flow and depositing on the laser optical windows where they initiate optical damage. The filters are composed of an inorganic compound in a woven configuration to trap particulates but the filters are of sufficiently low density so as to present a low pressure drop to the gas flow.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A recirculating gas laser comprising:
   a chamber containing laser gas and providing a cyclic path for the laser gas;
   a fan circulating the laser gas along the cyclic path;
   at least two discharge modules positioned within the chamber at separate locations along the cyclic path;
   independently triggerable high voltage pulse modules attached to each discharge module for generating an electrical discharge in the laser gas at the discharge modules;
   optical elements defining at least one resonant laser cavity holding the two discharge modules; and
   at least two acoustic baffles placed at least one between each of the discharge modules along the cyclic path such that the laser gas will flow alternately through a baffle and a discharge module as the laser gas follows the cyclic path, the acoustic baffles providing a greater impedance to shock waves caused by operation of the discharge module than to fan circulated gas.

2. The recirculating gas laser of claim 1 wherein each acoustic baffle comprises a subdivided metallic channel attached to an electrical return to neutralize plasma ions.

3. The recirculating gas laser of claim 2 wherein the subdivided channel provides multiple tortuous paths.

4. The recirculating gas laser of claim 2 wherein the channel is subdivided by conductive metal fins each in a chevron shape.

5. The recirculating gas laser of claim 4 wherein the conductive metal fins communicate with fluid filled passageways to conduct heat from the laser gas to the fluid.

6. The recirculating gas laser of claim 1 wherein the acoustic baffles substantially span an entire cross section of the chamber at locations of the baffles.

7. The recirculating gas laser of claim 1 wherein the optical elements define independent laser cavities for each discharge module.

8. The recirculating gas laser of claim 1 wherein the laser is a $CO_2$ gas laser operating at atmospheric pressure.

9. The recirculating gas laser of claim 1 wherein the chamber provides a toroidal lumen defining a portion of the cyclic path and further including a catalyst positioned at a center of the toroidal lumen outside of the toroidal lumen and communicating with the toroidal lumen through ducts receiving laser gas from the toroidal lumen into the catalyst and discharging laser gas from the catalyst into the toroidal lumen.

10. The recirculating gas laser of claim 9 wherein the catalyst recombines CO and $O_2$ into $CO_2$.

11. The recirculating gas laser of claim 9 wherein said catalyst module is composed of a fan, gas heating element upstream of a catalyst bed, and a catalyst bed, thereby providing control over the catalyst bed recombination rate and flow rate independent of the laser chamber main flow rate.

12. The recirculating gas laser of claim 9 wherein the catalyst includes a catalytic material in series along a path of the laser gas with a filter material blocking flow of the catalyst material.

13. The recirculating gas laser of claim 1 further including:
   window ports centered on each long axis of the discharge modules;
   external turn mirrors and optical elements to define total gain length, number of independent beams and wavelengths;
   wherein the external turn mirrors are attached to a rotating member which member when rotated into a position provides a single long path resonator for low gain lines and when rotated out of the position provides multiple laser beams on different wavelengths.

14. A method of operating a recirculating gas laser having a chamber containing laser gas and providing a cyclic path for the laser gas and having at least two discharge modules positioned within the chamber at separate locations along the cyclic path, the method comprising the steps of
   (a) circulating the laser gas along the cyclic path;
   (b) exciting an electrical discharge through the laser gas at the discharge modules;
   (c) mechanically suppressing a shock wave and plasma traveling along the cyclic path between discharge modules using acoustic and plasma baffles placed between each of the discharge modules along the cyclic path such that the laser gas will flow alternately through a baffle and a discharge module as the laser gas follows the cyclic path.

* * * * *